United States Patent Office 3,748,286
Patented July 24, 1973

3,748,286
PROCESS FOR POLYMERIZING
ISOBUTYLENE OXIDE
Atsushi Tanaka, Tokyo, and Hideo Sawada, Hirotaka Toba, Masahiko Kusumoto, and Kozi Sato, Saitama, Japan, assignors to Daicel Ltd., Higashi-ku, Osaka, Japan
No Drawing. Filed Dec. 10, 1970, Ser. No. 96,973
Claims priority, application Japan, Dec. 15, 1969, 44/100,761
Int. Cl. C08g 23/14
U.S. Cl. 260—2 A                                     6 Claims

ABSTRACT OF THE DISCLOSURE

High molecular weight polymers of isobutylene oxide are prepared by polymerizing isobutylene oxide in the presence of a novel ternary component catalyst consisting of an organozinc compound, water and a sulfur containing compound.

---

This invention relates to a process for producing a polymer of isobutylene oxide and a copolymer predominantly consisting of isobutylene oxide.

Generally, ethylene oxide derivatives become more difficult to polymerize with increasing number and bulk of substituents, and the degree of polymerization of the resulting polymers tends to be smaller. Methods using various polymerization catalysts have been proposed for polymerizing alkylene oxides such as ethylene oxide and propylene oxide. However, ethylene oxides substituted by a hydrocarbon radical and containing at least 4 carbon atoms are generally low in polymerization activity and can hardly be polymerized to high molecular-weight polymers with a single-component catalyst used ordinarily in the polymerization of alkylene oxides such as an iron compound, an organic acid salt of cobalt or manganese, an organometallic compound, or a sulfur-containing compound such as dithiocarbamate. In some cases, even the polymerization activity is not obtained. With a binary-component catalyst system comprising an organic compound and water the resulting polymer does not have a sufficiently high degree of polymerization, and it is difficult to obtain a polymer having a reduced viscosity of above 1.

Further, it has been reported that a ternary-component catalyst consisting of diethylzinc, water and an amine proved effective as a polymerization catalyst for hydrocarbon radical-substituted ethylene oxides such as isobutylene oxide. However, when the catalyst comprising diethylzinc, water and an amine is used, longer periods of time are needed for polymerization, and the resulting polymer tends to have a very high viscosity. Such a polymer is poor in shapeability or moldability, and in many cases, has bad stability unless a stabilizer is added thereto. Various other polymerization catalysts have been proposed, but when used for the polymerization of hydrocarbon radical-substituted ethylene oxides such as isobutylene oxide, give polymers of low molecular weight in poor yields. Hence, large quantities of the catalysts must be used, and such catalysts are not commercially feasible.

We have made extensive investigations, and ascertained that when isobutylene oxide is polymerized by using an organozinc compound as one component of the polymerization catalyst and a sulfur-containing derivative of the following general formula as other component of the catalyst, the polymerization activity of the catalyst proves superior, and polymers having excellent properties can be obtained. This discovery led to the accomplishment of the present invention. Specifically, the present invention relates to a process for producing a polymer having good stability and moldability by polymerizing isobutylene oxide in the presence of an organozinc compound, water and a sulfur-containing derivative of the following general formula with a high polymerization activity.

The sulfur-containing compound to be used in the present invention can be shown by the following general formula:

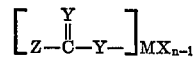

wherein Y is sulfur or oxygen, at least one of the Y's being sulfur, Z is a radical such as $R_1$, $OR_1$, $SR_1$ or $NR_2$, $R_1$ being alkyl, aryl, aralkyl, alkenyl or alkoxy-alkyl and $R_2$ being hydrogen or $R_1$, M is zinc, cadmium, magnesium, aluminum or iron, X is a monovalent halide, hydroxyl, hydride or hydrocarbon radical or the group

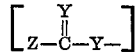

and is bonded to the metal atom, and $n$ is the atomic valency of the metal M.

If X is

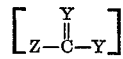

in this definition, the general formula of the sulfur-containing compound will be

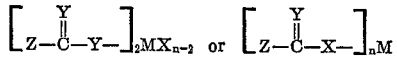

Examples of the sulfur-containing compound of the above formula include thiocarboxylates, dithiocarboxylates, dithiocarbonates, thiocarbonates, xanthates, trithiocarbonates, thiocarbamates, and dithiocarbamates. Specifically, we can name zinc dimethyldithiocarbamate, aluminum dimethyldithiocarbamate, magnesium diethyldithiocarbamate, zinc ethylphenyldithiocarbamate, zinc isopropylxanthogenate, cadmium isopropylxanthogenate, and ferric methylxanthogenate.

In the present invention, the above-mentioned sulfur-containing compounds may be used in admixture of two or more. Not only is it possible to perform the preparation of catalyst, the polymerization of monomer, or both of these operations in the presence of such a sulfur-containing compound, but also it is possible to add the sulfur-containing compound by some suitable method during such operation.

Since the degree of polymerization and the crystallinity of the resulting polymer varies according to the type, amount and feed time of the sulfur-containing compound to be added during the catalyst preparation, monomer polymerization or during both operations, polymers of the desired degree of polymerization and crystallinity can be produced by choosing these factors properly.

The catalyst of the present invention comprising the organozinc compound, water and the sulfur-containing compound can be prepared by mixing these three ingredients simply by a suitable method. Usually, however, it is adequate to carry out the catalyst preparation in the presence of an inert organic solvent. In the case of solution polymerization, it is advantageous to carry out the catalyst preparation in the same solvent as is used for polymerization. The catalyst preparation may be effected in the monomer to be polymerized, or by using only the three catalyst components. This method is especially convenient when the polymerization is performed in bulk.

Examples of the solvent for use in the catalyst preparation are aromatic hydrocarbons such as benzene or toluene, aliphatic hydrocarbons such as hexane or heptane, and mixtures thereof. But any liquid substances inert to the resulting catalyst and not affecting the catalyst preparation adversely can be used as the solvent for the catalyst preparation.

Further, any organozinc compounds having the formula ZnRR', where R and R' are the same or different hydrocarbon radicals, can be used as the catalyst component for polymerization of isobutylene oxide according to the present invention. Typical examples of such dihydrocarbon zinc compounds are dimethylzinc, diethylzinc, dipropylzinc, diisopropylzinc, di-n-butylzinc, diisobutylzinc, ditertiarybutylzinc, diamylzinc, dioctylzinc, and diphenylzinc. The aforementioned dialkylzincs which are relatively readily available are generally preferred. The amount of the zinc compound to be used is not particularly restricted, but is preferably 0.05–20 parts (by weight, as is the same throughout the specification) per 100 parts of isobutylene oxide. The amount of water is preferably 0.01 to 1.5 parts per 100 parts of isobutylene oxide, and the amount of the sulfur-containing compound, 0.3 to 20 parts per 100 parts of isobutylene oxide.

By varying the relative proportions of the zinc compound, water and the sulfur-containing compound, it is possible to change the degree of polymerization and the crystallinity of the resulting polymer, and a wide range of polymers ranging from those having high degree of polymerization and high crystallinity suited for fibers and films to those having relatively low degree of polymerization and crystallinity suited for plastics can be produced. Further in order to reduce the consumption of the catalyst, it is preferable to minimize the formation of impurities such as aldehydes and alcohols.

The polymerization reaction is carried out in the absence of a solvent, or in the presence of an inert solvent, for example aliphatic hydrocarbons such as hexane, heptane and octane, aromatic hydrocarbons such as benzene, toluene, tetralin or decalin, and ethers such as diethyl ether, tetrohydrofuran and dioxane.

There is no particular limitation on the polymerization temperature, and the polymerization is carried out at a temperature in the range of −70° C. to 270° C., preferably −20° C. to 150° C. Usually, the polymerization is carried out at atmospheric pressure, but, if necessary, under pressure at several tens kg./cm.$^2$.

The polymerization reaction can be performed by any conventional method. It may be by batchwise method or by continuous method. The catalyst may be added at a time, or in incremental amounts during the polymerization. It is also possible to add it continuously throughout the polymerization. hTe polymerization may also be performed in the presence of an additive such as antioxidants, carbon black and other stabilizers.

According to the present invention, not only isobutylene oxide homopolymers but also isobutylene oxide copolymers with ethylene oxide and other hydrocarbon-substituted ethylene oxides such as propylene oxide and styrene oxide can be obtained.

The high-molecular-weight isobutylene oxide polymers thus obtained can find wide applications as fabricated articles such as films, fibers, plastics, etc.

The present invention will be specifically described by the following non-limitative examples.

EXAMPLE 1

A glass ampoule was charged with 82 parts of n-hexane, 8.0 parts of zinc dimethyldithiocarbamate and 0.5 part of water, and after nitrogen substitution, 8.6 parts of diethylzinc (as a 1 mol/liter solution of n-hexane) was added. These compounds were stirred for 30 minutes at 650° C. in an atmosphere of nitrogen.

The resulting catalyst solution was cooled with Dry Ice-methanol solution, and 100 parts of isobutylene oxide was fed. After sealing by fusing, the glass ampoule was allowed to stand for 80 hours in a constant temperature vessel maintained at 70° C. to carry out the polymerization. A white massy polymer was obtained. The polymer was pulverized in methanol acidified with hydrochloric acid, filtered, washed with water, and then washed with methanol. The product so treated was dried by heating under reduced pressure. A polymer having a reduced viscosity of 2.1 was obtained in a yield of 82%.

The reduced viscosity in the Examples and Comparative Examples was measured by using an Ubbelohde's viscometer with respect to an o-dichloro-benzene solution of polymer (concentration: 0.1 g./100 cc.) at 110° C.

The X-ray diffraction pattern indicated that the polymer has high crystallinity. A plate-like molded article obtained by heat press was subjected to a tensile test, and was found to have a tensile strength of 407 kg./cm.$^2$ and an elongation of 35%.

Comparative Example 1

The same procedure as set forth in Example 1 was repeated except that water was omitted, and the polymerization of isobutylene oxide was performed for 140 hours. The resulting polymer had a reduced viscosity of 1.2 and the yield of the polymer was 29%.

Comparative Example 2

The same procedure as set forth in Example 1 was repeated except that zinc dimethyldithiocarbonate was omitted, and the polymerization was performed for 120 hours. The resulting polymer had a reduced viscosity of 0.6, and the yield of the polymer was 43%.

Comparative Example 3

The same procedure as set forth in Example 1 was repeated except that diethyl zinc and water were omitted and the polymerization was performed for 140 hours by using only 8.0 parts of zinc dimethyldithiocarbamate as the catalyst. A polymer could not be obtained at all.

When polyisobutylene oxide obtained in Example 1 was treated for 60 minutes at 140° C., its reduced viscosity decreased by 20%. On the other hand, the polymer obtained in Comparative Example 2 using the diethylzinc-water catalyst not containing zinc dimethyldithiocarbamate had its reduced viscosity decreased by 95% when treated under the same conditions.

EXAMPLE 2

The same procedure as set forth in Example 1 was repeated except that 8.0 parts of zinc ethylphenyl-dithiocarbamate was used instead of the zinc dimethyl-dithiocarbamate. The resulting polymer had a reduced viscosity of 1.5, and the yield of the polymer was 94%.

Comparative Example 4

The same procedure as set forth in Example 2 was repeated except that water was omitted. The yield of the polymer was 22%.

EXAMPLE 3

The polymerization of isobutylene oxide was performed in the same way as set forth in Example 1 by using 63 parts of n-hexane, 6.1 parts of zinc ethylphenyl-dithiocarbamate, 0.38 part of water and 6.6 parts of diethylzinc. By the 110-hour polymerization, there was obtained a polymer having a reduced viscosity of 3.0 in a yield of 81%.

The melt viscosity of the resulting polymer, measured under a load of 10 kg./cm.$^2$ to 40 kg./cm.$^2$ at a temperature of 190 to 210° C., was approximately 4,000 poises to 20,000 poises, which indicates that this polymer is easily moldable in a molten state.

EXAMPLE 4

The polymerization was performed for 43 hours under the same conditions as set forth in Example 3 except that the polymerization temperature was 80° C. There was obtained a polymer having a reduced viscosity of 1.2 in a yield of 65%.

EXAMPLE 5

The polymerization was performed under the same conditions as set forth in Example 2 except that 72 parts of ethylene oxide was added to 100 parts of isobutylene oxide. There was obtained an elastic copolymer having a reduced viscosity of 1.9 in a yield of 49%.

EXAMPLE 6

The polymerization was performed under the same conditions as set forth in Example 1 except that 6.0 parts of zinc isopropylxanthogenate was used instead of the zinc dimethyldithiocarbamate. There was obtained a polymer having a reduced viscosity of 1.0 in a yield of 80%.

What we claim is:

1. A process for producing high molecular weight polymers of isobutylene oxide, which comprises polymerizing isobutylene oxide in the presence of
   (1) from 0.05 to 20 parts by weight, per 100 parts of isobutylene oxide, of organo-zinc compound of the formula ZnRR' wherein R and R' are alkyl or phenyl
   (2) from 0.01 to 1.5 parts by weight of water, per 100 parts of isobutylene oxide, and
   (3) from 0.3 to 20 parts by weight, per 100 parts of isobutylene oxide, of sulfur-containing compound of the formula

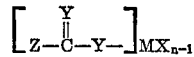

in which Y is sulfur or oxygen and at least one Y is sulfur, Z is $R_1$, $OR_1$, $SR_1$ or $NR_2$, wherein $R_1$ is alkyl, aryl, aralkyl, alkenyl or alkoxy-alkyl, and $R_2$ is hydrogen or $R_1$, M is zinc, X is monovalent, hydrocarbon radical or

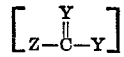

and $n$ is the valence of M.

2. The process as claimed in claim 1, in which R and R' are selected from the group consisting of alkyl having up to 8 carbon atoms and phenyl.

3. The process as claimed in claim 2, in which said organozinc compound is selected from the group consisting of dimethylzinc, diethylzinc, dipropylzinc, diisopropylzinc, di-n-butylzinc, diisobutylzinc, ditertiarybutylzinc, diamylzinc, dioctylzinc and diphenylzinc.

4. The process as claimed in claim 1, in which said sulfur-containing compound is selected from the group consisting of thiocarboxylates, dithiocarboxylates, dithiocarbonates, thiocarbonates, xanthates, trithiocarbonates, thiocarbamates and dithiocarbamates of zinc.

5. The process as claimed in claim 4, in which said sulfur-containing compound is selected from the group consisting of zinc dimethyldithiocarbamate, zinc ethylphenyldithiocarbamate and zinc isopropylxanthogenate.

6. The process as claimed in claim 1, in which the organozinc compound is diethyl zinc and the sulfur containing compound is selected from the group consisting of zinc dimethyldithiocarbamate, zinc ethylphenyl-dithiocarbamate and zinc isopropylxanthogenate.

References Cited
UNITED STATES PATENTS

| | | | |
|---|---|---|---|
| 3,135,705 | 6/1964 | Vandenberg | 260—2 |
| 3,345,308 | 10/1967 | Lal | 260—2 |
| 3,354,097 | 11/1967 | Vandenberg | 260—2 |
| 3,385,800 | 5/1968 | Furukawa et al | 260—2 |
| 3,399,149 | 8/1968 | Garty | 260—2 |
| 3,409,565 | 11/1968 | Lal | 260—2 |
| 3,509,068 | 4/1970 | Lal | 252—431 |
| 3,542,698 | 11/1970 | Lal | 260—2 |

WILLIAM H. SHORT, Primary Examiner

E. A. NIELSEN, Assistant Examiner

U.S. Cl. X.R.

252—431 R; 260—615 B